US010400459B2

(12) United States Patent
Williams

(10) Patent No.: US 10,400,459 B2
(45) Date of Patent: Sep. 3, 2019

(54) TILE SPACING TOOL AND METHOD

(71) Applicant: Gordon Williams, Cloverdale, IN (US)

(72) Inventor: Gordon Williams, Cloverdale, IN (US)

( * ) Notice: Subject to any disclaimer, the term of this patent is extended or adjusted under 35 U.S.C. 154(b) by 188 days.

(21) Appl. No.: 15/397,179

(22) Filed: Jan. 3, 2017

(65) Prior Publication Data
US 2017/0204623 A1 Jul. 20, 2017

Related U.S. Application Data

(60) Provisional application No. 62/278,618, filed on Jan. 14, 2016.

(51) Int. Cl.
G01B 3/30 (2006.01)
E04F 21/18 (2006.01)
G01B 5/14 (2006.01)

(52) U.S. Cl.
CPC .............. E04F 21/185 (2013.01); G01B 3/30 (2013.01); G01B 5/14 (2013.01)

(58) Field of Classification Search
CPC ..... E04F 21/185; E04F 21/02; E04F 21/0092; E04F 21/1838; G01B 3/30; G01B 3/46; G01B 5/14
USPC .......................................... 33/527, 526, 613
See application file for complete search history.

(56) References Cited

U.S. PATENT DOCUMENTS

| 1,941,404 A * | 12/1933 | Lansing | E04F 21/1844 33/410 |
| 4,860,723 A | 8/1989 | Fortin | |
| 5,119,567 A * | 6/1992 | Fox | E04F 21/1883 249/214 |
| 5,471,758 A | 12/1995 | White, Sr. | |
| 5,768,793 A * | 6/1998 | Fields | E04F 21/22 33/526 |
| 6,796,049 B1 | 9/2004 | Claxton | |
| 7,140,120 B1 * | 11/2006 | Huttemann | G01B 3/30 33/526 |
| 7,257,926 B1 * | 8/2007 | Kirby | E04F 21/0092 33/526 |
| 7,946,093 B1 | 5/2011 | Sturino | |
| 8,919,076 B1 | 12/2014 | Kitchens | |
| 9,121,187 B1 * | 9/2015 | Bunch | E04F 21/0092 |
| 9,845,604 B2 * | 12/2017 | Lockwood | E01C 19/526 |
| 2002/0069545 A1 * | 6/2002 | Belliveau | E04B 5/12 33/526 |
| 2003/0033724 A1 | 2/2003 | Barbosa | |
| 2014/0033641 A1 * | 2/2014 | Trevisi | E04F 21/0092 52/749.1 |

(Continued)

FOREIGN PATENT DOCUMENTS

| GB | 2270338 A * | 3/1994 | E04F 21/185 |
| GB | 2504882 A * | 2/2014 | E04F 21/185 |
| GB | 2516908 A * | 2/2015 | E04F 21/185 |

Primary Examiner — Christopher W Fulton
(74) Attorney, Agent, or Firm — Taft Stettinius & Hollister LLP

(57) ABSTRACT

A tile spacing tool is disclosed herein that spans a gap between tile rows where the gap is sized to receive a decorative insert or the like. The spacing tool spans the gap and transfers the weight of the upper tile rows across the gap to the lower tile rows, which are supported by a floor or ledge. As a result, the entire wall can be built including the decorative insert without waiting for the bottom tile rows to dry to support the weight of the tile rows above the decorative insert.

11 Claims, 2 Drawing Sheets

(56) References Cited

U.S. PATENT DOCUMENTS

2016/0333596 A1* 11/2016 Kudrna .............. E04F 21/0076

* cited by examiner

TILE SPACING TOOL AND METHOD

CROSS-REFERENCE TO RELATED APPLICATION

The present application claims the benefit of the filing date of U.S. Provisional Application Ser. No. 62/278,618 filed on Jan. 14, 2016, which is incorporated herein by reference.

FIELD OF THE INVENTION

The present description relates to a tool and method for spacing and supporting tiles.

BACKGROUND

Tiles are typically placed on an adhesive such as mortar to attach the tiles to the underlying surface. Spacers are used between tiles to provide a uniform spacing between the tiles. In wall applications, the bottom tiles rest on a support surface, such as a floor or ledge. The second row of tiles rests on the bottom row of tiles via spacers that are positioned on the bottom row of tiles. The stacking of rows of tiles is repeated up to the top row of tiles such that the spacers transfer the weight of all the tile rows to the bottom row, and thus to the floor or ledge. The spacers are removed after the mortar is cured or dried sufficiently to hold the tiles in place, and the gaps between the tiles are then filled with grout.

For some types of wall designs, decorative inserts are used that are not able to support the weight of additional rows of tiles above the insert, or include uneven edges or backing material that make support of the upper tile row on the decorative insert using prior art spacers impractical. For these types of designs, the wall is built up to the insert and then it is necessary to wait for the adhesive to dry or cure before installing the tile rows above the decorative insert in order to prevent these tile rows from disturbing the placement of the decorative insert. Therefore, further improvements in this area are needed.

SUMMARY

A tile spacing tool is disclosed herein that spans a gap between adjacent tile rows, where the gap is sized to receive a decorative insert or the like. The spacing tool spans the gap to contact the adjacent tile rows and transfer the weight of the upper tile rows across the gap to the lower tile rows. As a result, the entire wall can be built including the decorative insert without waiting for the adhesive used for the bottom tile rows and the decorative insert to dry to support the weight of the tile rows above the decorative insert.

In one embodiment, the tile spacing tool includes an elongated support rod and first and second plates extending outwardly from the support rod, at least one of which is movably secured to the support rod. At least one of the support plates can be rotated and threaded along the support rod to adjust the spacing between the plates to correspond to the size of the gap between the tile rows that receives the decorative insert. In one embodiment, at least the movable plate is circular in shape so its rotational position or orientation relative to the support rod is irrelevant, and the spacing between the plates is infinitely adjustable by rotating and threadingly displacing one or both of the plates along the rod. In another embodiment, each of the first and second plates is circular in shape and threadingly engaged to the support rod so that each plate can be rotated to infinitely adjust the spacing between the plates to define a distance between the plates that corresponds to a size of the gap between two tile rows that receive the decorative insert therebetween.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
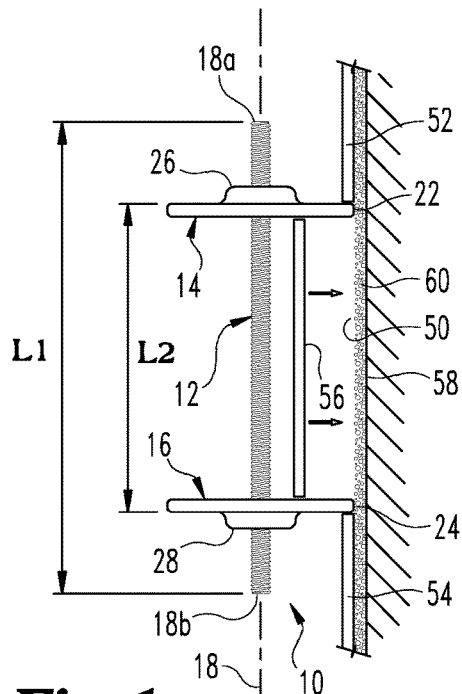
FIG. 1 is a side elevational view of one embodiment of a tile spacing tool employed to space and support adjacent tile rows to receive a decorative insert between the tile rows.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 5:
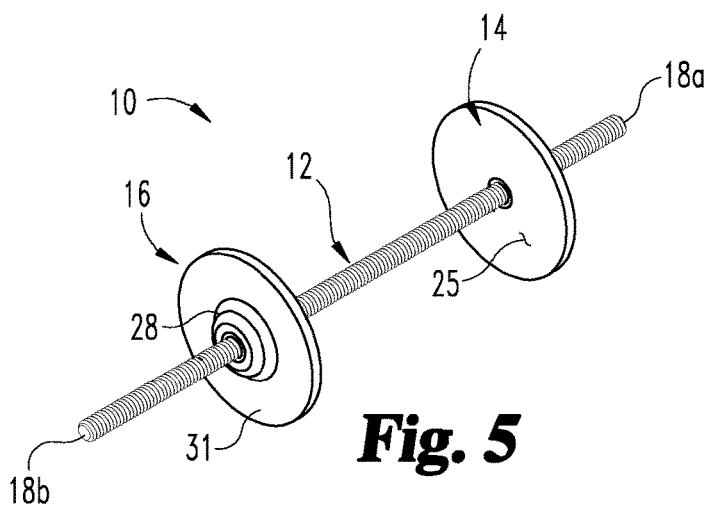
FIG. 5 is a perspective view of the tile spacing tool of FIG. 1.
Figure 6:
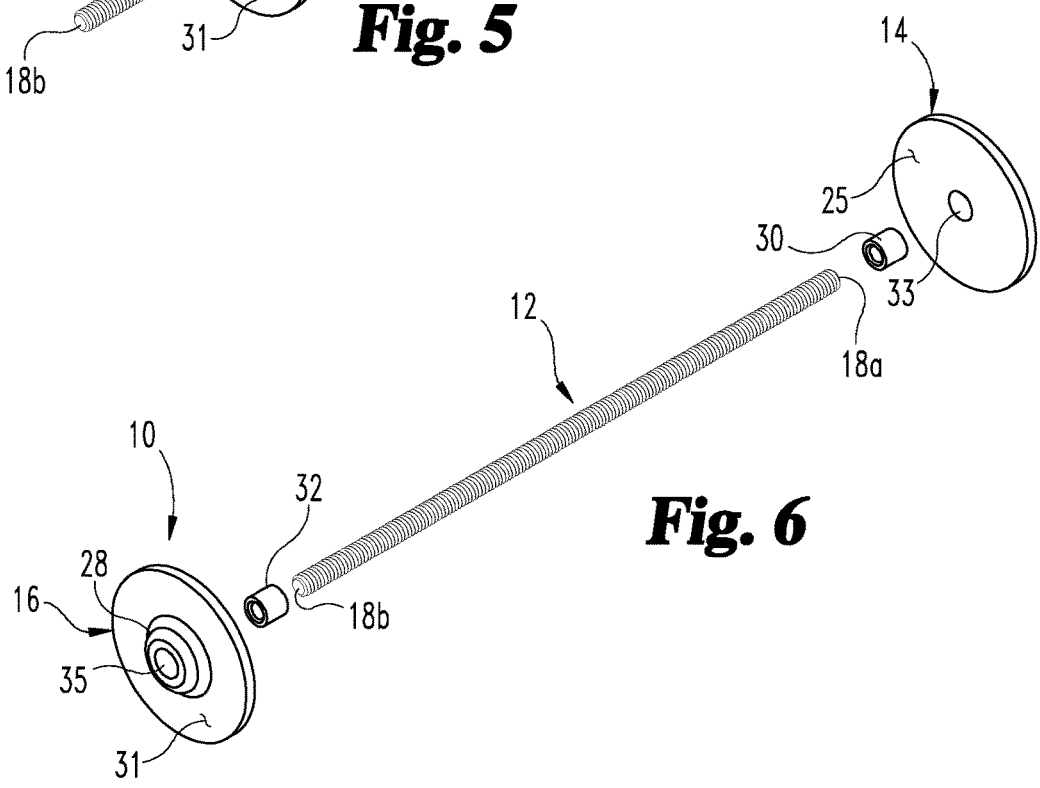
FIG. 6 is an exploded perspective view of the tile spacing tool of FIG. 1.

FIG. 1 is a side elevational view of a tile spacing tool 10 that spans a gap 50 to support an upper tile row 52 on a lower tile row 54. Gap 50 is sized to receive an insert 56 such as a decorative tile insert, a mosaic, or other insert that can be used in a tile wall. Tile spacing tool 10, shown also in FIGS. 5 and 6, includes an elongated support rod 12, a first or upper plate 14, and a second or lower plate 16. Elongated support rod 12 includes a length L1 extending along a longitudinal axis 18 between a first end 18a and an opposite second end 18b. Upper and lower plates 14, 16 are mounted to support rod 12, and at least one of the plates 14, 16 is longitudinally movable along longitudinal axis 18 and length L1 of support rod 12 to adjust a spacing L2 between upper and lower plates 14, 16 to correspond to the size of gap 50.

Upper tile row 52 and lower tile row 54 are mounted to a support surface 58 such as a wall with an adhesive 60. Adhesive 60 is also used to secure insert 56 to support surface 58 between tile rows 52, 54. The tile rows 52, 54 are supported on an adjacent face of the respective upper plate 14 and lower plate 16, respectively. The upper and lower plates 14, 16 project radially outwardly from support rod 12 the same distance so that the outer edge 22, 24 of the respective upper and lower plate 14, 16 will contact the same vertical wall support surface with support rod 12 parallel to the vertical wall support surface.

Figure 2:
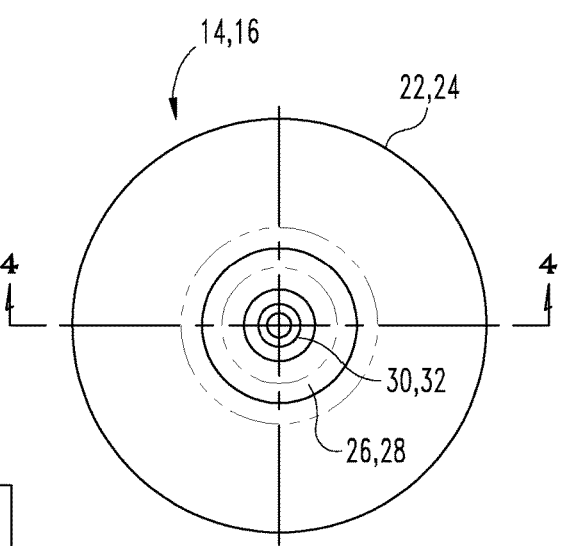
FIG. 2 is a plan view of the tile spacing tool of FIG. 1.
Figure 4:
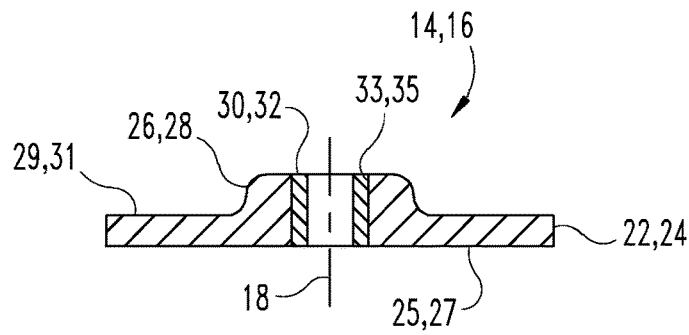
FIG. 4 is a cross-sectional view of a plate of the tile spacing tool of FIG. 1 along line 4-4 of FIG. 2.

Referring further to FIGS. 2 and 4, each plate 14, 16 extends to a respective outer edge 22, 24 that defines a perimeter that is circular in shape. Each plate 14, 16 further includes a planar inner surface 25, 27, respectively, that face one another and that each define a plane that is orthogonal to longitudinal axis 18. Each plate 14, 16 includes a dome-shaped center hub 26, 28, respectively, on its center axis (axis of rotation) which is aligned with longitudinal axis 18. Center hubs 26, 28 project axially from a respective outer surface 29, 31 of plates 14, 16, opposite of the respective planar inner surface 25, 27. An internally threaded bushing 30, 32 is provided within a respective through-hole 33, 35 through the respective center hub 26, 28, and through-holes 33, 35 are centered around longitudinal axis 18. Support rod 12 also includes a circular cross-section orthogonal to longitudinal axis 18, and an outer thread profile that threadingly engages the respective internally threaded bushing 30, 32.

Each of the plates 14, 16 is threadingly engaged to support rod 12 and can be rotated to longitudinally displace the respective plate 14, 16 along support rod 12 and adjust the spacing L2 in an infinitely variable manner so that the gap 50 can be any size less than L1 or greater than a thickness between outer surfaces 29, 31 when inner surfaces 25, 27 are positioned in contact with one another. Furthermore, since at least one of the movable plate or plates 14, 16 has a circular outer perimeter, the plate(s) 14, 16 can be stopped at any rotational position along support rod 12 and used to support the tile rows since any location on outer edge(s) 22, 24 can be used to support an adjacent tile row 52, 54.

In another embodiment, only one of plates 14, 16 is longitudinally movable along support rod 12. In still another embodiment, only one of plates 14, 16 is circular while the other plate 14, 16 is non-circular, and the non-circular plate is fixed or is fixable in longitudinal position relative to support rod 12. In any of the embodiments, support rod 12 and/or bushings 30, 32 can be made from a metal or other rigid, stiff material, although non-metal material could also be used. Plates 14, 16 can be made from plastic or other material that can be cleaned to remove adhesive or other materials therefrom, although non-plastic materials can be used. In another embodiment, a scale or other measurement tool can be provided along support rod 12 to measure the space L2.

Figure 3:
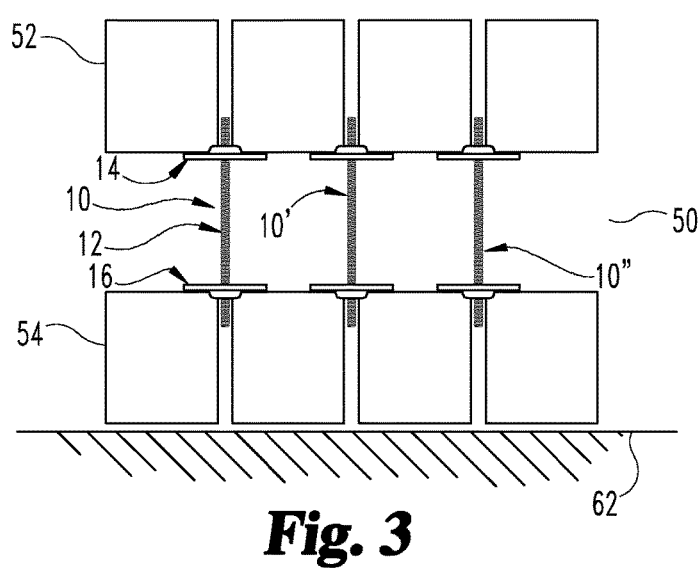
FIG. 3 is a front elevational view of adjacent tile rows supported by a plurality of tile spacing tools of FIG. 1.

Referring to FIG. 3, upper tile row 52 and lower tile row 54 are shown with gap 50 therebetween. More upper tile rows and/or lower tile rows may be used. A plurality of tile spacing tools 10, 10', 10", etc. are used to support upper tile row 52 on lower tile row 54. Lower tile row 54 sits on a floor or ledge 62. An insert 56 will have a particular height when placed on a wall. The tile spacing tool(s) 10 can be set with plates 14, 16 at spacing L2 corresponding to that height to maintain an appropriately sized gap between the tile rows to receive the insert. Insert 56 can be any type of decorative insert or setting which fits into the gap 50 between the tile rows.

The tile spacing tools 10 are adjusted to accommodate the width or height of the insert 56 and then placed so that the bottom or outer face 31 of bottom plate 16 rests against the upper edge of a corresponding tile of the bottom tile row 54. The upper tile row 52 is above the upper plate 14 of tile spacing tool 10. The upper tile row 52 is placed against the adhesive on the wall and rests on top of a top our outer face 29 of the upper plate 14. The tile spacing tools 10, 10", etc. may be added after the tiles and the insert 56 have been pressed into the adhesive. The tile spacing tools 10 may then be used to define and maintain a specific spacing between the adjacent tile rows 52, 54. The tiles in the tile rows and the insert may be adjusted in position on the wall while the adhesive is wet. Using the tile spacing tool 10, all of the tiling can all be placed up the wall from the bottom-most row to the top-most row at one time with the inserts positions as desired. After the mortar has dried, all of the spacers and tile spacing tools may be removed, and then the tiles may be grouted. This allows the entire wall installation to be installed more quickly than waiting for the lower tile rows and decorative inserts to cure before placing the upper tile rows. The insert 56 may be installed before or after the tile spacing tool(s) is placed on the wall. The insert 56 may be installed before or after the adhesive for the upper and lower tile rows has set.

Various aspects of the present disclosure are contemplated. For example, a tile spacing tool is disclosed that includes an elongated threaded support rod extending between a first end and an opposite second end, and a first plate mounted toward the first end of the support rod and a second plate mounted toward the second end of the support rod. At least one of the first and second plates is circular in shape and threadingly engaged to the support rod and threadingly adjustable along the support rod to adjust a spacing between the first and second plates to correspond to a size of a gap between adjacent tile rows spaced to receive a decorative insert therebetween.

In one embodiment, each of the first and second plates is circular in shape. In a refinement of this embodiment, the elongated threaded support rod extends along a longitudinal axis between the first and second ends, and each of the first and second plates defines a respective plane that is orthogonally oriented to the longitudinal axis. In a further refinement of this embodiment, the circular shape of each of the first and second plates lies in the respective plane. In another refinement, each of the first and second plates is threadingly engaged to the support rod and threadingly adjustable along the support rod.

In additional refinements of the disclosed embodiments, each of the first and second plates defines a through-hole on its center axis and each of the first and second plates includes an internally threaded bushing in the through-hole that is threadingly engaged to the support rod. In another refinement, each of the first and second plates includes a hub extending along the center axis and each bushing is positioned within a respective one of the hubs. In yet another refinement, each of the first and second plates is made of plastic material and the support rod and each bushing are made of metal material.

According to another aspect of the present disclosure, a tile spacing tool includes an elongated threaded support rod extending between a first end and an opposite second end, and a first plate mounted toward the first end of the support rod and a second plate mounted toward the second end of the support rod. Each of the first and second plates is threadingly engaged to the support rod and threadingly adjustable along the support rod to adjust a spacing between the first and second plates to correspond to a size of a gap between adjacent tile rows spaced to receive a decorative insert therebetween.

In one embodiment, each of the first and second plates includes an outer perimeter that defines a circular shape. In another embodiment, the elongated threaded support rod extends along a longitudinal axis between the first and second ends, and each of the first and second plates defines a respective plane that is orthogonally oriented to the longitudinal axis.

In another embodiment, each of the first and second plates defines a through-hole on its center axis and each of the first and second plates includes an internally threaded bushing in the through-hole that is threadingly engaged to the support rod. In a refinement of this embodiment, each of the first and second plates includes a hub extending along the center axis and each bushing is positioned within a respective one of the hubs.

According to yet another aspect of the present disclosure, a method includes placing at least one lower row of tiles against an adhesive on a surface; placing at least one upper row of tiles against the adhesive on the surface with the upper row of tiles spaced from an uppermost edge of the at least one lower row of tiles by a gap sized to accommodate an insert between the uppermost edge and a lowermost edge of the at least one upper row of tiles; adjusting a height of a plurality of tile spacing tools so that a distance between an upper plate and a lower plate of the spacing tool correspond in size to the gap, where adjusting the height includes rotating at least one of the upper and lower plates to displace it longitudinally along a support rod; placing the tile spacing tools so the lowermost edge of the at least one upper row of tiles is supported by the upper plate and the lower plate is supported on the uppermost edge of the lower row of tiles; and placing the insert in the gap against the adhesive on the surface while the upper row of tiles is supported by the at least one lower row of tiles while the adhesive cures.

In one embodiment, the method includes removing the tile spacing tools after the adhesive cures. In another embodiment, at least one of the upper and lower plates is circular in shape and infinitely adjustable in position along the support member. In yet another embodiment, each of the upper and lower plates is circular in shape and infinitely adjustable in position along the support member.

In another embodiment, at least one of the upper and lower plates is threadingly engaged to the support rod. In a refinement of this embodiment, each of the upper and lower plates is threadingly engaged to the support rod. In a further refinement, each of the first and second plates is circular in shape.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A tile spacing tool, comprising:
an elongated threaded support rod extending between a first end and an opposite second end; and
a first plate mounted toward the first end of the support rod and a second plate mounted toward the second end of the support rod, wherein each of the first and second plates is threadingly engaged to the support rod and threadingly adjustable along the support rod to adjust a spacing between the first and second plates to correspond to a size of a gap between adjacent tile rows spaced to receive a decorative insert therebetween, wherein each of the first and second plates includes an outer perimeter that defines a circular shape and each of the first and second plates is rotated around the support rod for displacement longitudinally along the support rod so that one of the adjacent tile rows is supportable by the first plate at any rotational orientation of the first plate along the support rod and the other of the adjacent tile rows is supportable by the second plate at any rotational orientation of the second plate along the support rod.

2. The tile spacing tool of claim 1, wherein:
the elongated threaded support rod extends along a longitudinal axis between the first and second ends; and
each of the first and second plates defines a respective plane that is orthogonally oriented to the longitudinal axis.

3. The tile spacing tool of claim 2, wherein the circular shape of each of the first and second plates lies in the respective plane.

4. The tile spacing tool of claim 1, wherein each of the first and second plates includes an internally threaded bushing in the through-hole that is threadingly engaged to the support rod.

5. The tile spacing tool of claim 4, wherein each of the first and second plates includes a hub extending along the center axis and each bushing is positioned within a respective one of the hubs.

6. The tile spacing tool of claim 5, wherein each of the first and second plates is made of plastic material and the support rod and each bushing are made of metal material.

7. A tile spacing tool, comprising:
an elongated threaded support rod extending between a first end and an opposite second end; and
a first plate mounted toward the first end of the support rod and a second plate mounted toward the second end of the support rod, wherein each of the first and second plates is threadingly engaged to the support rod and threadingly adjustable along the support rod to adjust a spacing between the first and second plates to correspond to a size of a gap between adjacent tile rows spaced to receive a decorative insert therebetween, wherein each of the first and second plates includes an outer perimeter that defines a circular shape and each of the first and second plates is rotated around the support rod for displacement longitudinally along the support rod so that one of the adjacent tile rows is supportable by the first plate at any rotational orientation of the first plate along the support rod and the other adjacent tile row is supportable by the second plate at any rotational orientation of the second plate along the support rod.

8. The tile spacing tool of claim 7, wherein:
the elongated threaded support rod extends along a longitudinal axis between the first and second ends; and
each of the first and second plates defines a respective plane that is orthogonally oriented to the longitudinal axis.

9. The tile spacing tool of claim 7, wherein each of the first and second plates defines a through-hole on its center axis and each of the first and second plates includes an internally threaded bushing in the through-hole that is threadingly engaged to the support rod.

10. The tile spacing tool of claim 9, wherein each of the first and second plates includes a hub extending along the center axis and each bushing is positioned within a respective one of the hubs.

11. A method, comprising:
- placing at least one lower row of tiles against an adhesive on a surface;
- placing at least one upper row of tiles against the adhesive on the surface with the upper row of tiles spaced from an uppermost edge of the at least one lower row of tiles by a gap sized to accommodate an insert between the uppermost edge and a lowermost edge of the at least one upper row of tiles;
- adjusting a height of a plurality of tile spacing tools so that a distance between an upper plate and a lower plate of the spacing tool correspond in size to the gap, wherein each of the upper plate and the lower plate is circular and threadingly engaged to a support rod and adjusting the height includes rotating each of the upper and lower plates relative to the other of the upper and lower plates to displace each of the upper and lower plates longitudinally along the support rod so that upper row of tiles is supported by the upper plate at any rotational orientation of the upper plate along the support rod and the lower row of tiles is supported by the lower plate at any rotational orientation of the lower plate along the support rod;
- placing the tile spacing tools so the lowermost edge of the at least one upper row of tiles is supported by the upper plate and the lower plate is supported on the uppermost edge of the lower row of tiles; and
- placing the insert in the gap against the adhesive on the surface while the upper row of tiles is supported by the at least one lower row of tiles while the adhesive cures.

* * * * *